G. W. DENNETT.
DECOY.
APPLICATION FILED MAY 14, 1921.
1,409,285.
Patented Mar. 14, 1922.
3 SHEETS—SHEET 3.
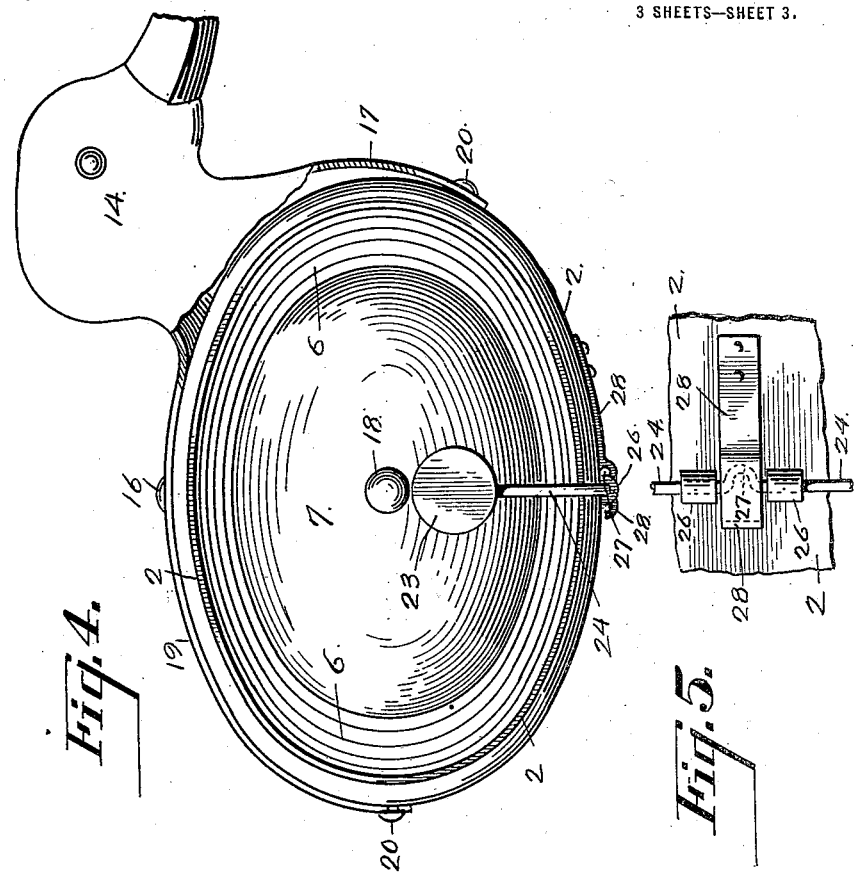
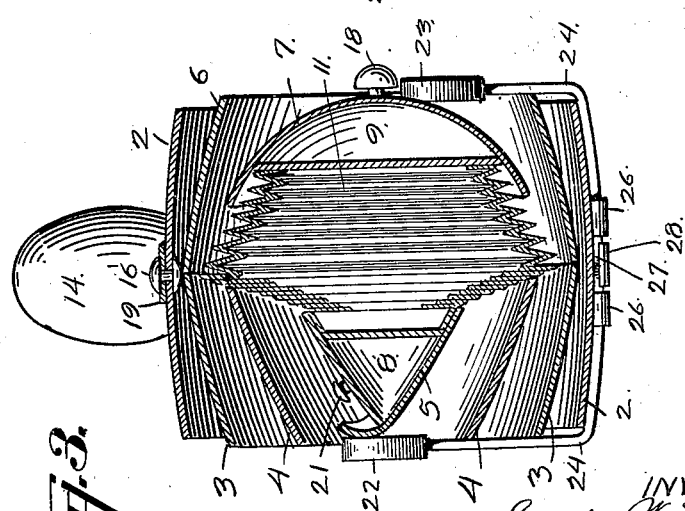
INVENTOR.
Gordon W. Dennett
BY Arthur L. Slee
ATTY.

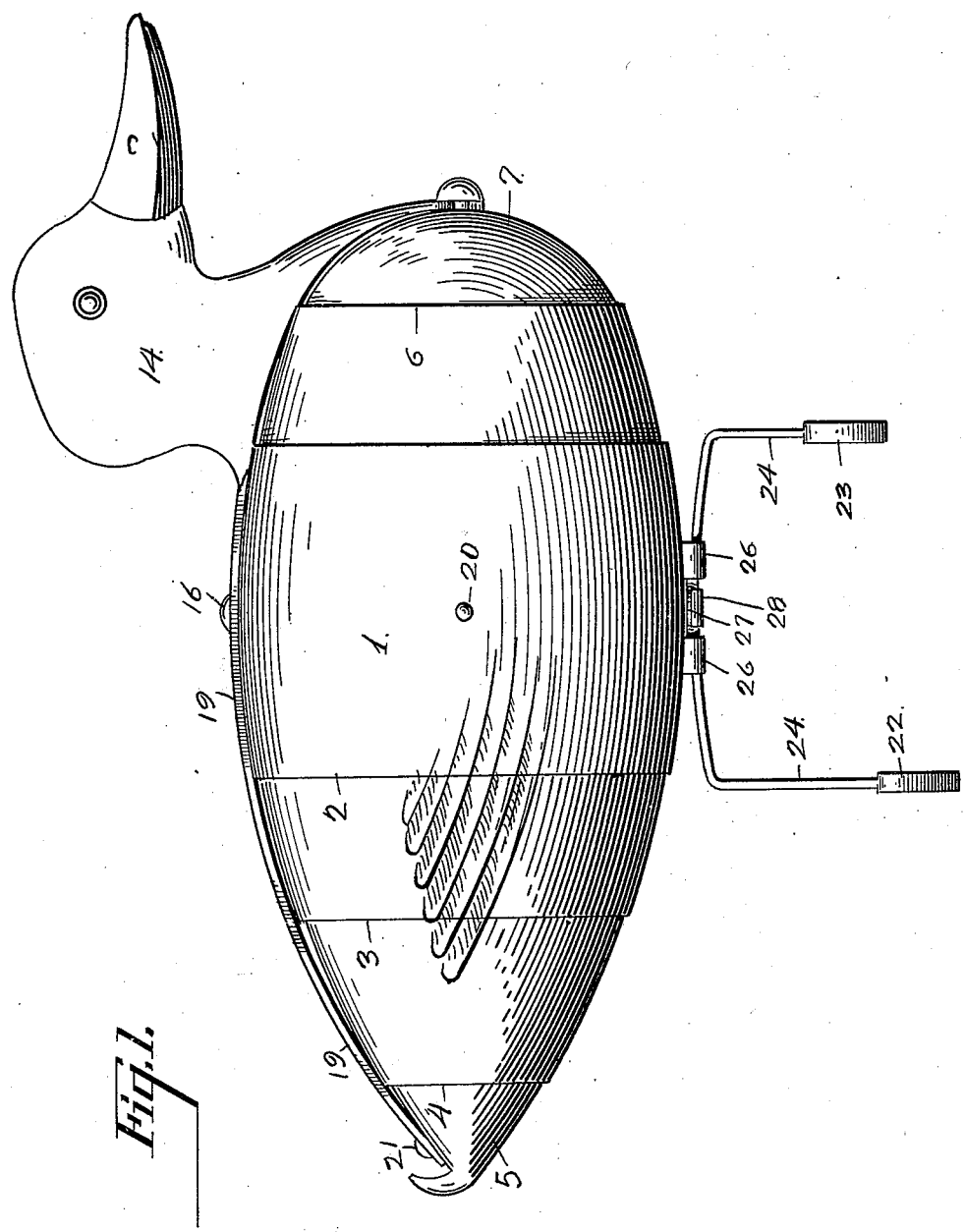

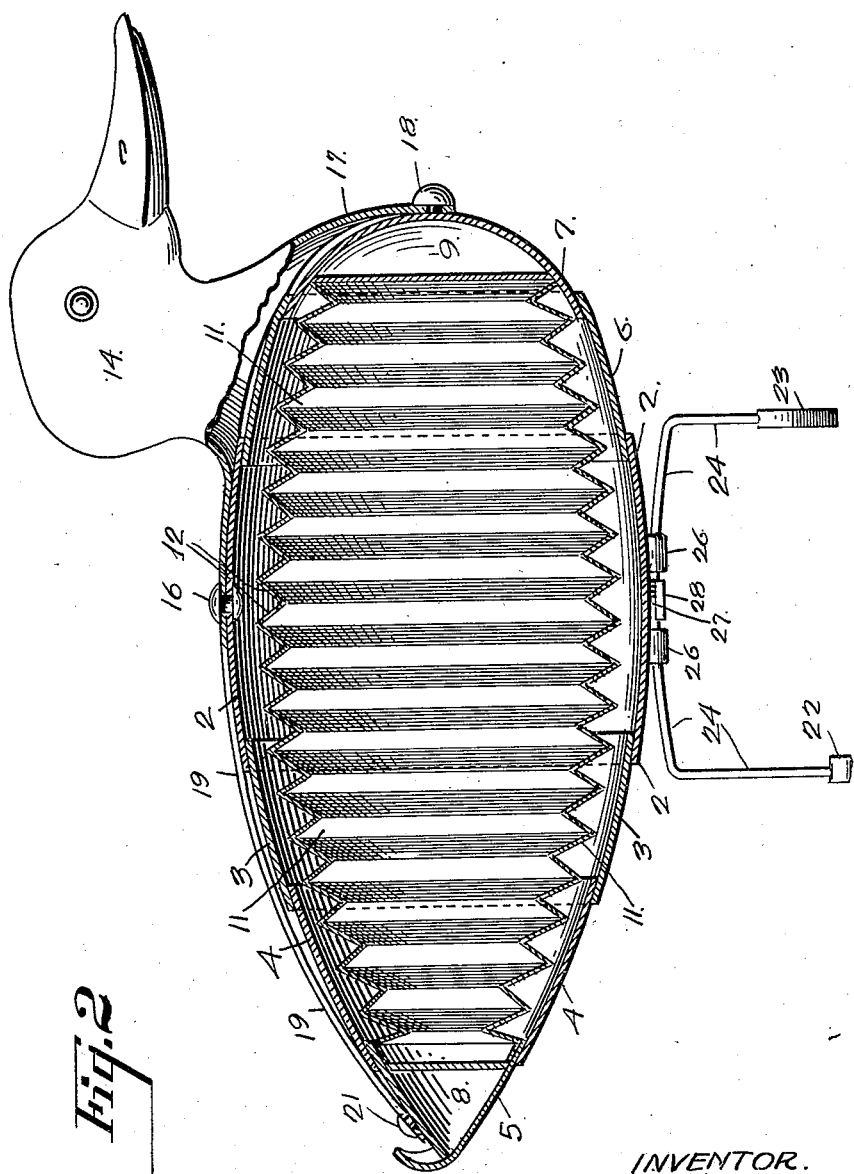

UNITED STATES PATENT OFFICE.

GORDON W. DENNETT, OF SAN FRANCISCO, CALIFORNIA.

DECOY.

1,409,285. Specification of Letters Patent. Patented Mar. 14, 1922.

Application filed May 14, 1921. Serial No. 469,714.

*To all whom it may concern:*

Be it known that I, GORDON W. DENNETT, a citizen of the United States, residing in the city and county of San Francisco and State of California, have invented a new and useful Improvement in Decoys, of which the following is a specification.

My invention relates to improvements in decoys for decoying ducks and similar wild game wherein a plurality of collapsible sections are arranged to form a decoy body when extended and operate in conjunction with means for retaining said sections in extended or operative position and also improved means for balancing the decoy in such extended position, said balancing means being also arranged to be moved to lock the several sections in closed or collapsed position.

The primary object of the present invention is to provide a new and improved decoy for decoying wild ducks and similar wild game.

Another object of the invention is to provide a new and improved device of the character described which may be easily and readily extended and locked to an operative or floating position.

A further object of the invention is to provide an improved decoy which may be easily and readily collapsed to a small compact shape to facilitate transportation.

A still further object of the invention is to provide an improved decoy of the type set forth having an improved collapsible air container or receiver arranged to be automatically collapsed and extended with the several sections of the decoy or body to impart buoyancy thereto.

I accomplish these and other objects by means of the improved decoy disclosed in the drawings forming a part of the present specification wherein like characters of reference are used to designate similar parts throughout the said specification and drawings, and in which:

Fig. 1 is a side elevation of my improved decoy in an extended or operative position.

Fig. 2 is a longitudinal vertical sectional view of the decoy extended, the head being shown in elevation.

Fig. 3 is a longitudinal vertical sectional view of the decoy in a collapsed or inoperative position.

Fig. 4 is a side elevation of Fig. 3; and

Fig. 5 is a broken detail view disclosing the manner in which the balancing weight is held in a balancing or section-locking position.

Referring to the drawings the numeral 1 is used to designate in general the body of a decoy duck comprising a central or main section 2, rear sections 3, 4 and 5 and front sections 6 and 7, the sections 5 and 7 being rear and front end sections respectively.

The several sections mentioned are arranged to be collapsed into the main or central section 2 telescopically and from their respective sides of said main section 2. The end sections 5 and 7 are provided with air-tight compartments 8 and 9 respectively in order to impart buoyancy to the decoy. To automatically impart further buoyancy to said sections when extended to form a decoy, I have provided a collapsible air container or receiver 11 preferably of the accordion type, but any suitable collapsible or flexible container may be used.

The container 11 is provided with several apertures 12 in the upper portion thereof to permit the passage of air to and from the interior of the container 1, when extended and collapsed.

A head 14 is made of suitable shape and color to represent the head of the wild game being sought or decoyed and said head is pivotally mounted upon the main section 2 as at 16 and provided with front and rear extensions 17 and 19 slotted laterally and in opposite directions adjacent their ends to detachably engage buttons or rivets 18 and 21 on the front and rear sections 7 and 5 respectively, said head 14 and its extensions 17 and 19 being turned on its pivotal point 16 to engage and disengage the said buttons.

The extensions 17 and 19 are sufficiently flexible to be bent to engage and disengage similar buttons 20, on opposite sides of the main section 2 as disclosed in Fig. 4 of the drawings, when the decoy or body 1 is in a collapsed or inoperative position.

A pair of balancing weights 22 and 23 depend from the ends of a U-shaped wire 24 pivotally mounted within longitudinally disposed bearings 26 on the lower surface of the central or main section 2 of the decoy 1, said wire 24 being provided intermediate said bearings 26 with an offset portion 27 engaged by a flat spring 28 also secured to the under or lower surface of said main section 2 and arranged to normally retain the balancing weights 22 and 23 in either a section-locking position as in Figs. 3 and 4 of the drawings, or in a balancing position as disclosed in Figs. 1 and 2 of the drawings.

In order to collapse the decoy 1 to an inoperative or folded position the head 14 is swung through a quarter turn on its pivot 16 thereby detaching the extensions 17 and 19 from the buttons 18 and 21 on the front and rear sections 7 and 15 respectively.

The end sections 5 and 7 are now moved inwardly or collapsed with the remaining sections into the main section 2 as disclosed in Fig. 3 of the drawings.

As the sections are collapsed into the main or central section 2 the collapsible container 11 is also simultaneously and automatically collapsed and during such collapse the air is forced through the apertures 12.

The wire 24 with its balancing weights 22 and 23 is now moved in its bearings to bring the said weights 22 and 23 opposite and in contact with the end sections 5 and 7 respectively, as disclosed in Figs. 3 and 4 of the drawings. The portions of the wire 24 between the bearings 26 and weights will engage the lower edges of the intermediate sections and prevent their inadvertent removal or extension while the wire 24 is in such position.

The extensions 17 and 19 of the head 14 are now detachably connected to the buttons or rivets 20 on the sides of the central section 2 as disclosed in Fig. 4 of the drawings.

To extend the decoy to an operative or floating position the U-shaped wire 24 with its weights 22 and 23 are first moved to a depending position, the spring 28 engaging the offset portion 27 of said wire to retain said weights in said balancing position.

The several sections are next extended by means of their respective buttons or tail piece on the rear end section 5 thereby automatically extending and inflating the container 11 through its apertures 12 and the ends of the extensions 17 and 19 of the head 14 are then detached from the side buttons 20 and moved into detachable engagement with the buttons or rivets 21 and 18 of the rear and front sections 5 and 7 respectively, to retain said sections in extended position.

Having thus described my invention, what I claim as new and desire to secure by Letters Patent is:

1. A decoy comprising a plurality of collapsible sections arranged to form a decoy when extended; means for maintaining said sections in an extended position; and decoy balancing means operatively connected to one of the sections and arranged to be moved to lock said sections in a collapsed position.

2. A decoy comprising a plurality of collapsible sections arranged to form a decoy when extended; means for maintaining said sections in an extended position; decoy balancing means operatively connected to one of the sections and arranged to be moved to lock said sections in a collapsed position; and means for normally retaining said balancing means in a balancing or section-locking position.

3. A decoy comprising a plurality of collapsible sections arranged to form a decoy when extended; and a collapsible air container connected to each of the end sections and arranged to be automatically extended and inflated when said sections are extended to impart buoyancy to said decoy; and a decoy head pivotally mounted upon one of the sections and having extensions arranged to engage the end sections to retain the decoy in an extended position.

4. A decoy comprising a plurality of collapsible sections arranged to form a decoy when extended, the two end sections having water-tight compartments therein to render buoyancy to said decoy; means for retaining said sections in an extended position; and balancing means operatively connected to one of said sections and arranged to be folded to lock said sections in collapsed position.

5. A decoy comprising a plurality of collapsible sections arranged to form a decoy when extended, the two end sections having water-tight compartments therein to render buoyancy to said decoy; means for retaining said sections in an extended position; balancing means operatively connected to one of said sections and arranged to be folded to lock said sections in collapsed position; and means for normally retaining said balancing means in either a section-locking or balancing position.

6. A decoy comprising a plurality of collapsible sections arranged to form a decoy when extended, the two end sections having water-tight compartments therein to render buoyancy to said decoy; and a head piece for the decoy pivotally mounted upon one of the sections and having extensions arranged to detachably engage the end sections to retain all of said sections in an extended position.

In witness whereof I hereunto set my signature.

GORDON W. DENNETT.